S. R. NYE.

HORSE HAY RAKE.

No. 6678 Reissued Oct 5, 1875

Witnesses
[illegible]
T. C. Smith

Inventor
Sherman S. Nye

UNITED STATES PATENT OFFICE.

SHERMAN R. NYE, OF WINCHENDON, MASSACHUSETTS.

IMPROVEMENT IN HORSE-RAKES.

Specification forming part of Letters Patent No. 105,833, dated July 26, 1870; reissue No. 6,678, dated October 5, 1875; application filed August 2, 1875.

*To all whom it may concern:*

Be it known that I, SHERMAN R. NYE, of Winchendon, in the county of Worcester and State of Massachusetts, have invented certain new and useful Improvements in Horse Hay-Rakes; and I do hereby declare that the following is a full, clear, and exact description thereof, that will enable others skilled in the art to which it appertains to make and use the same, reference being had to the accompanying drawings and to the letters of reference marked thereon.

Figure 2:
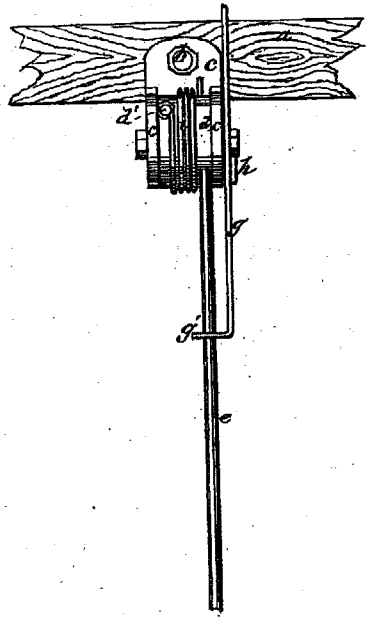
Figure 3:
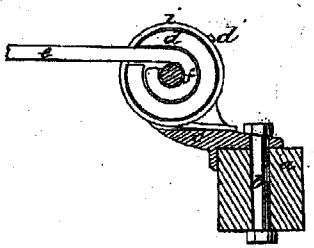
Figure 1:
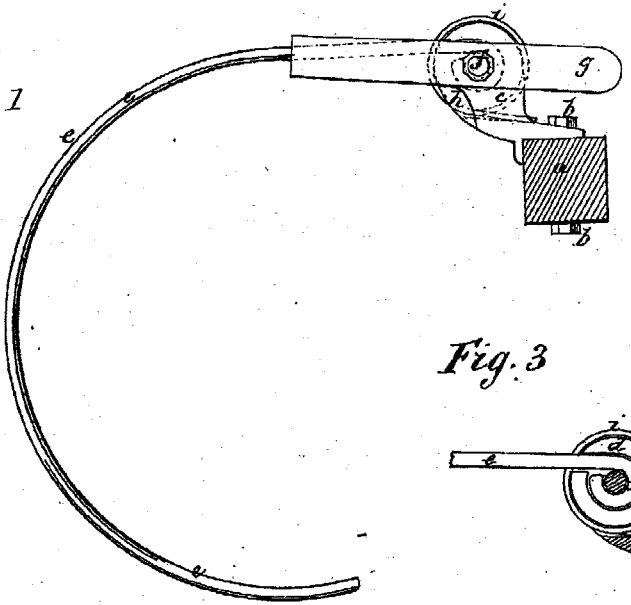

In the accompanying drawing, forming a part of this specification, Figure 1 represents a side elevation of a rake-tooth and its appurtenances as attached to a rake-head. Fig. 2 represents a plan of the parts shown in Fig. 1, and Fig. 3 represents a vertical section of the tooth-holder.

This invention relates to that class of horse hay-rakes in which each rake-tooth is pivoted to a holder attached to the rake-head, and adapted to swing or vibrate in a vertical plane independently of the usual simultaneous motion of all the rake-teeth in dumping their accumulation of hay, each tooth being held downward with yielding pressure by a spring, which causes the tooth to aid in gathering the hay, and at the same time permits it to yield or rise sufficiently to pass over fixed obstructions upon the surface of the ground.

My invention has for its object to enable each independently-pivoted rake-tooth of the class above mentioned to be held downward with a yielding pressure by a torsional spring supported entirely by the holder to which the tooth is pivoted, and also to provide means for bracing each independently-pivoted tooth, and limiting its independent vibration to a defined arc.

To these ends my invention consists, first, in the combination of a torsional spiral spring with a holder and a pivoted rake-tooth, the spring being supported entirely by said holder in such manner as to exert a downward-yielding pressure on the tooth by its torsion. It consists, secondly, in the combination, with each independently-pivoted tooth, of a brace, which supports and strengthens the tooth, and acts, in conjunction with suitable stops, in such manner as to limit the independent vibrations of the tooth, all of which I will now proceed to describe.

In the drawings, *a* represents the rake-head, and *c* one of the spring and tooth holders, attached to the head *a* by a bolt, *b*. The holder *c* projects from the rake-head *a*, and to its outer portion *d f* the tooth *e* is pivoted in such manner as to rise and fall in a substantially vertical plane. *i* is a torsional spiral spring, which encircles and is supported by the upper portion of the holder *c* in such manner as to exert a downward-yielding pressure on the tooth *e* by torsion, the spring making a constant effort to unwind itself or return to a state of rest, and in making this effort it constantly holds the tooth downward with a yielding pressure, enabling the tooth to rise and yield to fixed obstructions, and returning it quickly to its operative position.

Heretofore the holding-down springs of this class of rake-teeth have been so constructed as to bear upon the tooth at a considerable distance from its pivot, and as the tooth rises and falls in its independent motion this point of contact constantly changes, or, in other words, there is a constant rubbing of the spring upon the tooth, which tends to wear away the latter, and cause its ultimate breakage. These springs have generally been made in two forms—one flat or curved, attached to the holder of the pivoted tooth, and exerting pressure upon the tooth by its effort to regain its normal position when bent, and the other spiral, and applied in such manner as to exert pressure on the tooth by longitudinal expansion. These forms are both open to the objection above named, as they bear upon the tooth at a distance from its pivot, and, in addition to this, they are both more difficult of application than my torsional spring, which, encircling and being supported by the holder, does not bear upon the tooth at a distance from its pivot, and is readily applied to the holder.

*g* represents a brace, which is pivoted to the holder *c* on the same axial line as the tooth *e*. The outer end of the brace *g* is bent, and provided with an orifice, through which the tooth passes, the main portion of the brace being substantially parallel with the tooth. The brace *g* is in effect a part of the tooth *e*, as both are pivoted on the same axial line, and rise and fall together. The independent vibrations of the tooth are limited by stops *h a*, the former consisting in an offset from the side of the holder, and the latter consisting in the rake-head. The stop *h* limits the downward vibration or movement of the tooth and its brace, and the stop *a* the upward vibration or movement. Hence the vibrations of the tooth are limited by these stops to a defined arc, thus preventing too great freedom of motion on the part of the tooth. The brace *g* also strengthens and supports the rake-tooth vertically and laterally, as will be readily seen.

I claim as my invention—

1. The combination of a holder adapted to be attached to a rake-head, a rake-tooth pivoted to said holder in such manner as to rise and fall in a substantially vertical plane, and a torsional spiral spring supported entirely by said holder, and exerting a downward-yielding pressure by torsion on the pivoted tooth.

2. The holder *c*, in combination with the tooth *e* and torsional spiral spring *i*, substantially as described, for the purpose specified.

3. The brace or lever *g*, in combination with the holder *c*, tooth *e*, and stops *h a*, substantially as and for the purpose specified.

In testimony that I claim the foregoing I have hereunto set my hand this 30th day of July, 1875.

SHERMAN R. NYE.

Witnesses:

CHARLES F. BROWN,

SAML. M. BARTON.